(No Model.) 5 Sheets—Sheet 1.

J. P. WETHERILL.
MAGNETIC SEPARATOR.

No. 555,794. Patented Mar. 3, 1896.

Attest:
F. H. Schott
Harry G. Davis

Inventor:
John Price Wetherill,
By Hunne & Goldsborough
Attys.

(No Model.) 5 Sheets—Sheet 2.

J. P. WETHERILL.
MAGNETIC SEPARATOR.

No. 555,794. Patented Mar. 3, 1896.

Attest:
F. H. Schott
Harry G. Davis

Inventor:
John Price Wetherill
By Seymour & Goldsborough
Attys.

(No Model.) 5 Sheets—Sheet 3.
J. P. WETHERILL.
MAGNETIC SEPARATOR.
No. 555,794. Patented Mar. 3, 1896.
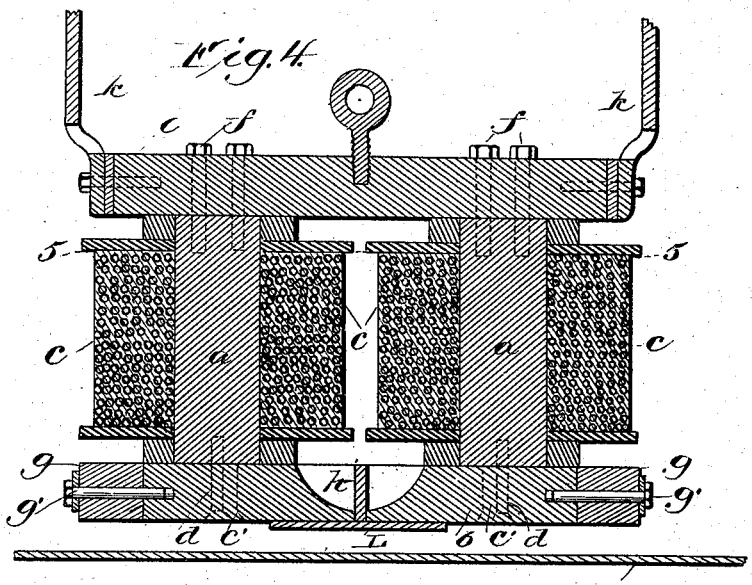
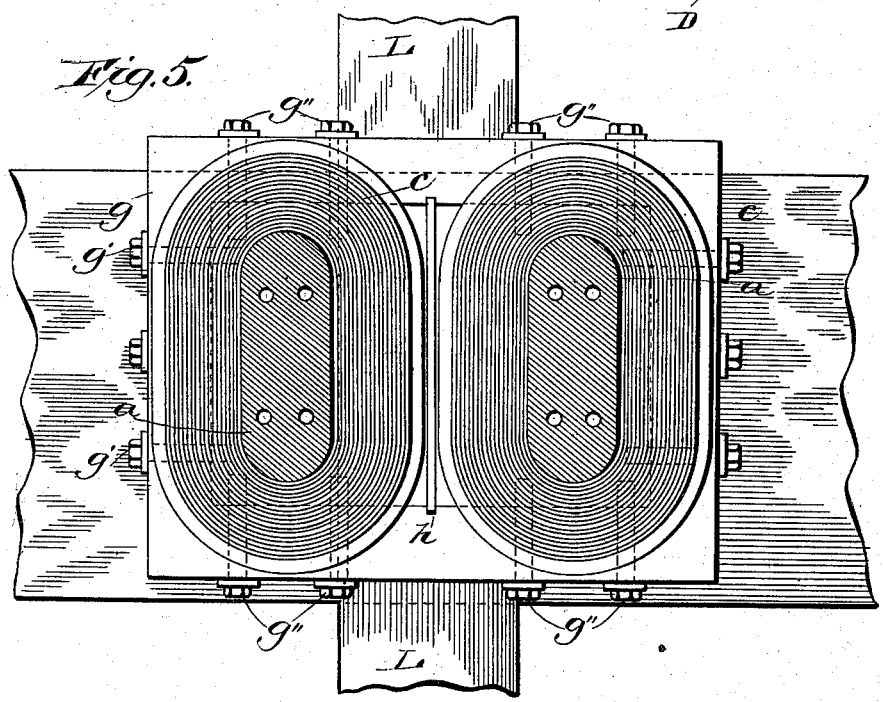
Witnesses:
J. M. Fowler Jr.
Harry G. Davis.
Inventor:
John Price Wetherill,
by Kenner & Goldsborough,
Attorneys.

(No Model.)
5 Sheets—Sheet 4.
J. P. WETHERILL.
MAGNETIC SEPARATOR.
No. 555,794.
Patented Mar. 3, 1896.
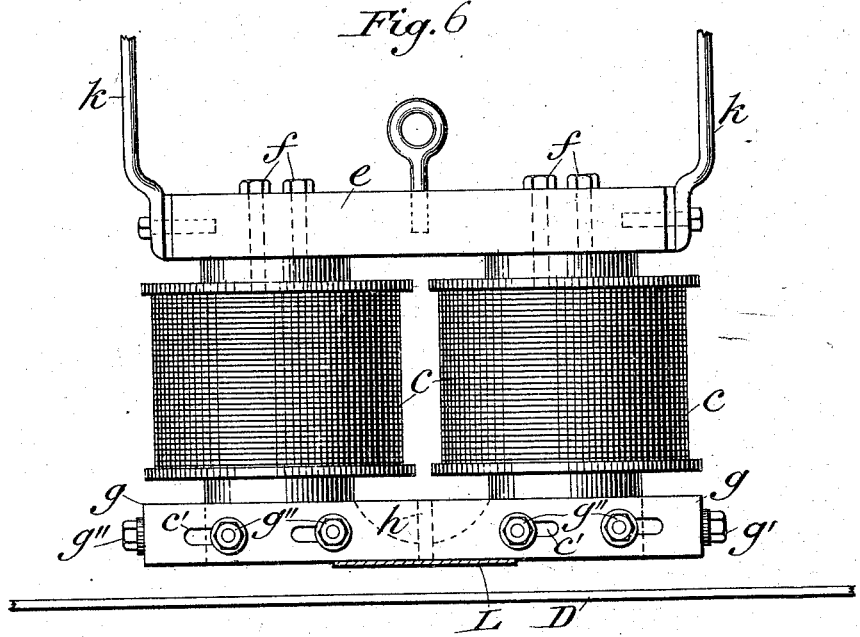
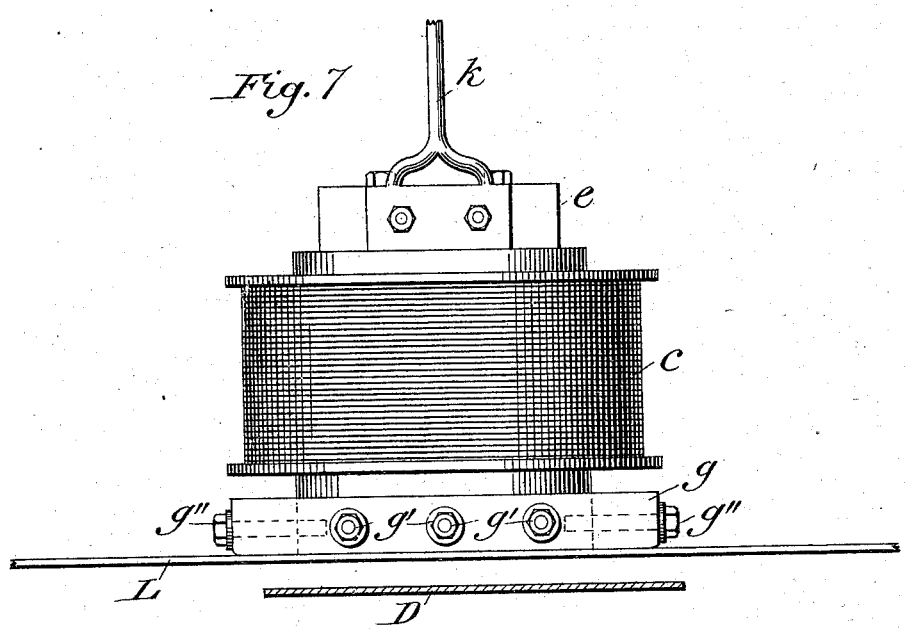
Attest:
F. H. Schott
Harry V. Davis
Inventor.
John Price Wetherill,
By Pennie & Goldsborough,
Attys.

(No Model.) 5 Sheets—Sheet 5.

J. P. WETHERILL.
MAGNETIC SEPARATOR.

No. 555,794. Patented Mar. 3, 1896.

Attest:
F. H. Schott
Harry V. Davis

Inventor:
John Price Wetherill,
By Nimmo & Goldsborough
Attys.

UNITED STATES PATENT OFFICE.

JOHN PRICE WETHERILL, OF SOUTH BETHLEHEM, PENNSYLVANIA.

MAGNETIC SEPARATOR.

SPECIFICATION forming part of Letters Patent No. 555,794, dated March 3, 1896.

Application filed February 10, 1896. Serial No. 578,784. (No model.)

*To all whom it may concern:*

Be it known that I, JOHN PRICE WETHERILL, a citizen of the United States, residing at South Bethlehem, in the county of Northampton and State of Pennsylvania, have invented certain new and useful Improvements in Magnetic Separators; and I do hereby declare the following to be a full, clear, and exact description of the invention, such as will enable others skilled in the art to which it appertains to make and use the same.

My invention relates to certain new and useful improvements in magnetic separators adapted for the separation from mixtures containing them of paramagnetic substances of very low magnetic permeability or susceptibility—such as hematite, siderite, menaccanite, rutile, troostite, garnet, and the like.

Figures 1, 3:
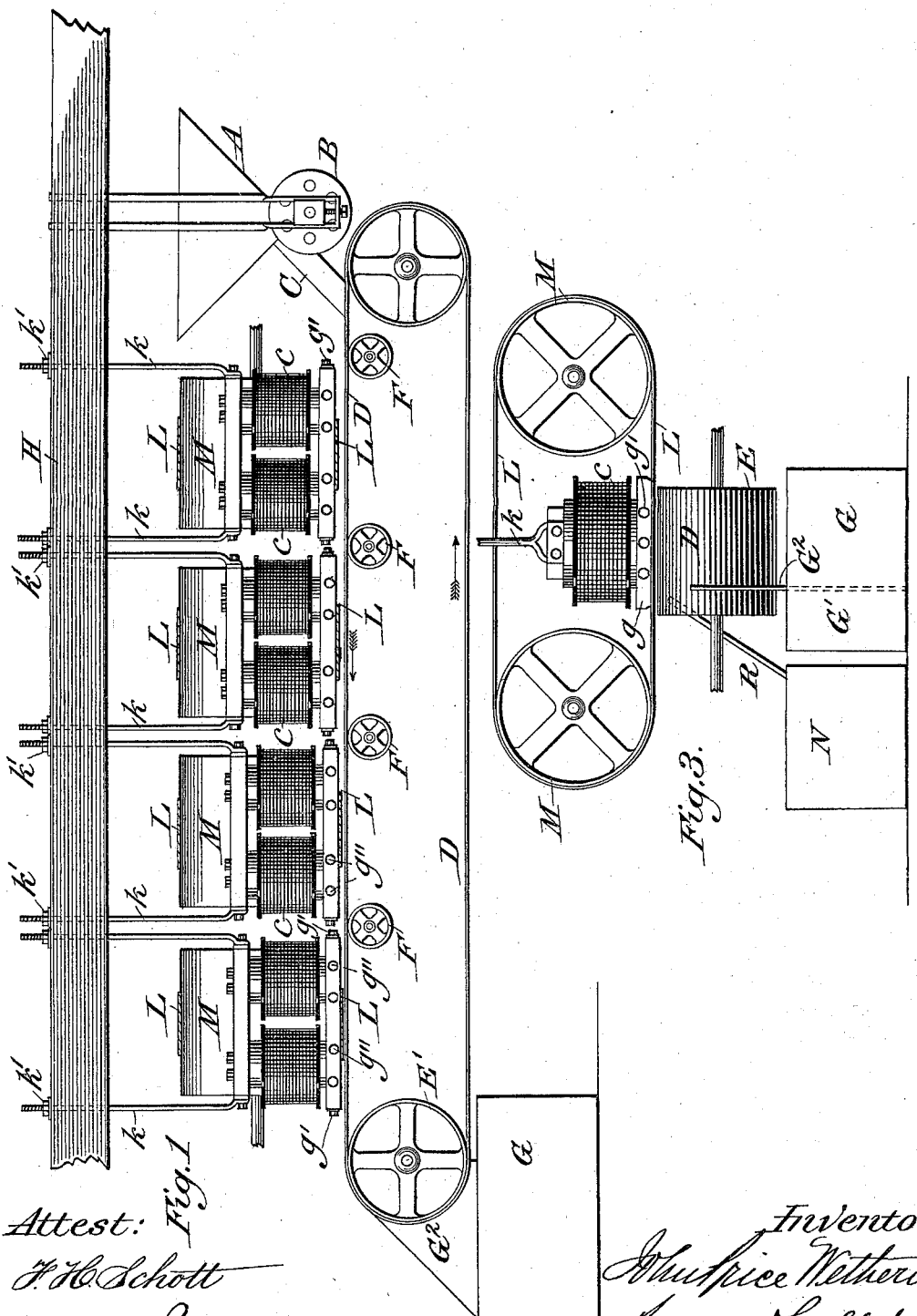
Figure 2:
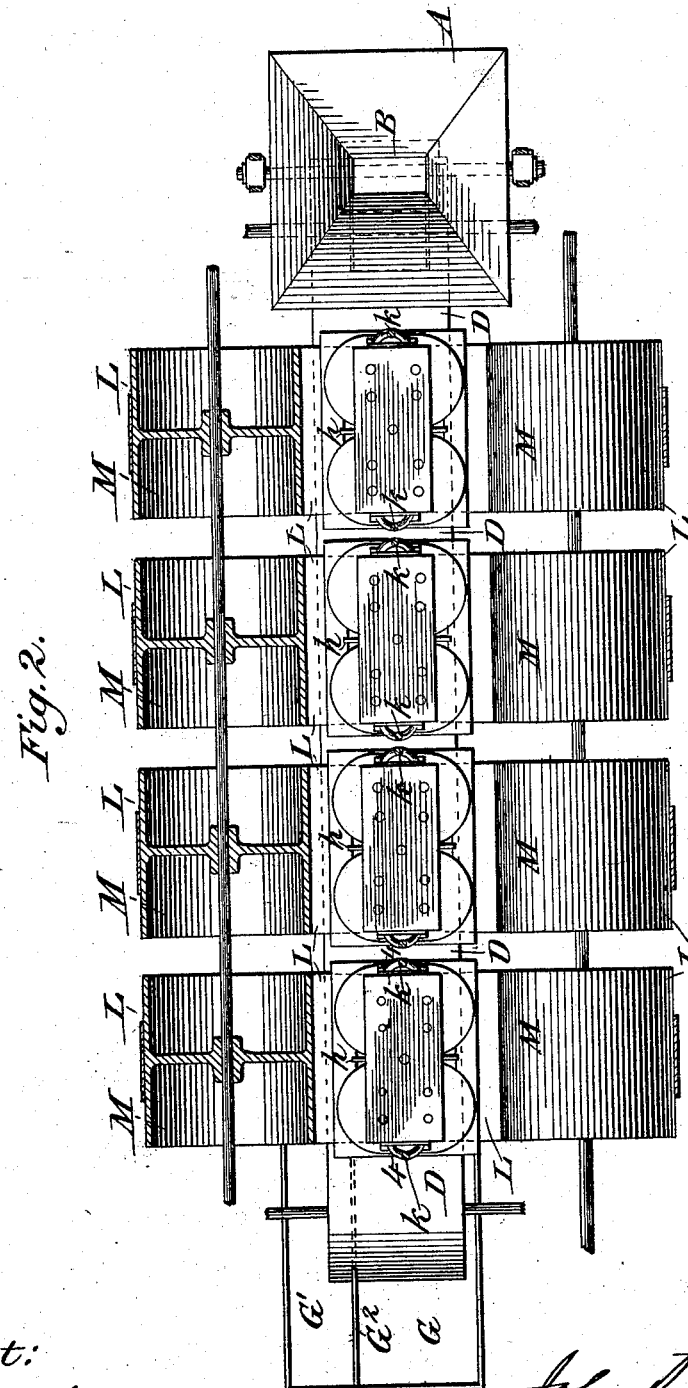
Figure 8:
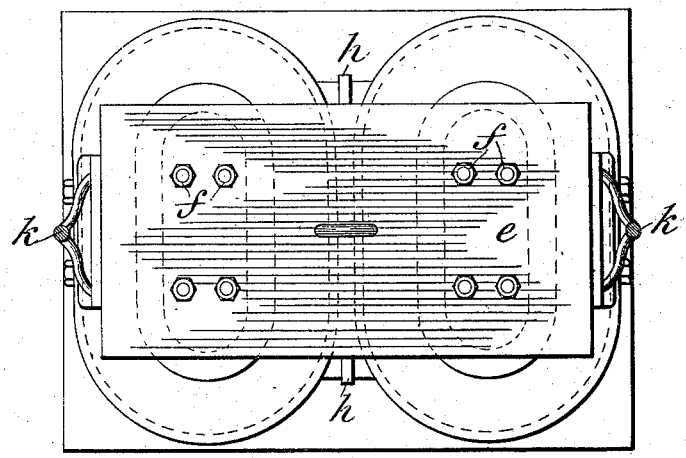
Figure 9:
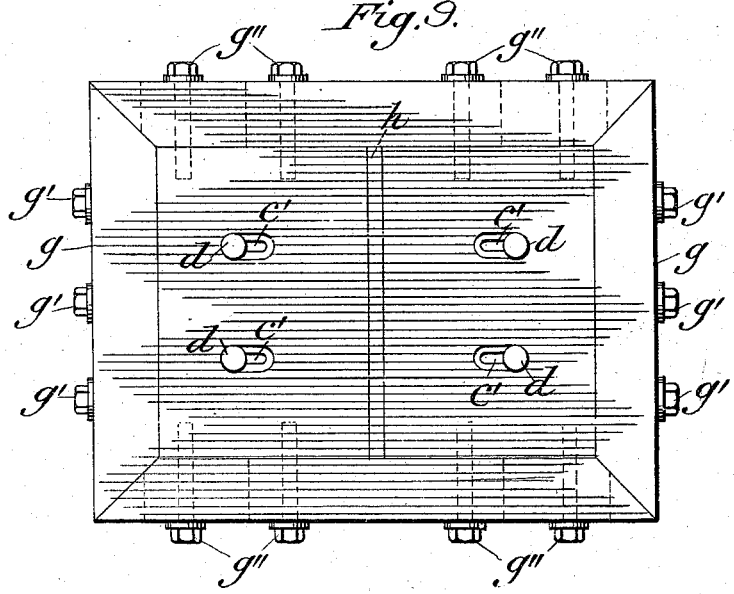

In the accompanying drawings, Figure 1 represents, partly in side elevation and partly in section, an apparatus embodying my invention. Fig. 2 represents a plan view thereof, partly in section. Fig. 3 represents an end elevation. Fig. 4 represents a vertical section through one of the electromagnets, the cross-belt, and conveyer-belt on a plane indicated by the line 4 4 of Fig. 2. Fig. 5 represents a cross-section on the line 5 5 of Fig. 4. Fig. 6 represents a side elevation of one of the electromagnets and a portion of the conveyer-belt, the cross-belt being shown in section. Fig. 7 represents a front elevation of one of the electromagnets and a portion of the cross-belt, the conveyer-belt being shown in section. Fig. 8 represents a top plan view of one of the electromagnets and a portion of the conveyer-belt; and Fig. 9 represents a bottom plan view of one of the electromagnets.

Similar letters of reference indicate similar parts throughout the several views.

Referring to the drawings, A indicates a feed-hopper for the reception of the ore mixture to be separated, said ore mixture having first been crushed to a degree sufficient to separate the different minerals, preferably sufficiently to pass through a sieve of No. 10 mesh. Within the bottom of this hopper rotates a feed-wheel B, adapted to supply the ore to the chute C in such regulated quantity as to deliver upon the endless conveyer-belt D a layer of about one-eighth of an inch in thickness, said layer being spread out equally upon the belt D and of a breadth preferably somewhat less than the breadth of the pole-pieces of the electromagnets. Thus, in practice, with electromagnets having cores six and three-fourths inches high by two and one-half inches wide by eight inches broad, and with pole-pieces equally broad, I have obtained the best results by having the breadth of the ore-layer slightly less than that of the core and pole-pieces. With an ore-layer, say, seven inches broad, moving directly beneath the pole-pieces, I make the conveyer-belt of a width that will give a margin of about two and a half inches on the delivery side of the separated ferruginous material, for a purpose hereinafter described.

The endless belt D may conveniently be stretched upon the rollers E E', either of which may serve as a driving-pulley, and at various points are located the supporting-idlers F. Beneath the roller E' is stationed a receptacle divided into two compartments G G' by a partition G², the smaller compartment being for the reception of any ore that may be diverted from the original path to the margin of the conveyer-belt, and which is to be again passed through the apparatus, and the larger being for the reception of the main portion of the moving layer after it has passed the electromagnets and been deprived of the minerals of low magnetic susceptibility thereby.

The electromagnets that I have employed in practice are clearly shown in detail in Figs. 4 to 9 inclusive. They consist of cores $a$, of the dimensions hereinbefore specified, provided with corresponding pole-pieces $b$, each core being wrapped with a winding $c$ consisting of forty-nine layers of No. 10 copper wire twenty-one layers deep. The pole-pieces are adjustable toward and from each other by means of the slots $c$ and screws $d$, and decrease in thickness, as shown, toward their polar extremities, so as to form a highly condensed or concentrated magnetic field. The cores of each magnet are connected by a cross-piece $e$, through which screw-bolts $f$ pass into screw-threaded recesses in the cores, and the pole-pieces $b$ are incased within a frame made up of the end pieces $g$, having screw-bolts $g'$ adapted to enter screw-threaded openings in the pole-pieces, and the side pieces having through-bolts $g''$ passing through slots $c'$ in the frame. As an additional feature I also prefer to interpose between the pole-pieces a spacing-bar $h$ of vulcanized fiber or the like.

From the cross-piece $e$ extend hangers $k$ adapted to pass through openings in one of the frame-beams H of the apparatus. These hangers are screw-threaded at their upper ends for the reception of nuts $k'$, whereby the height of the electromagnets above the conveyer-belt D may be accurately adjusted.

In close proximity to the under surface of the pole-pieces I arrange a conveyer moving transverse to the conveyer D and interposed between the pole-pieces and the surface of the ore-layer. This transverse conveyer may conveniently consist of an endless belt L, of thin cotton, muslin or the like, or of a rotating disk of thin metallic substance. The endless belt L is passed over the roller M and receives motion from one of said rollers. The electromagnets attract the minerals of low magnetic susceptibility in such manner as to cause a narrow line of their particles to rise from the ore-current immediately adjacent to and between the opposing edges of the tapering pole-pieces and to assemble against the under side of the cross-belt L. The function of the cross-belt or its equivalent is to carry the attracted particles transversely of the ore-current and along this line of attraction to one end of the pole-pieces, where they accumulate until sufficient weight has been added to the mass to cause the surplus to drop off. As this surplus is constantly supplied, it results that a continuous stream of the attracted particles is caused to flow transverse to the ore on the main belt, and said stream is directed into a suitable collecting-receptacle N by a chute R.

In Figs. 1 and 2 of the drawings I have shown an apparatus wherein, in conjunction with the main conveyer-belt D, four electromagnets having their windings connected in series and with a corresponding number of cross-belts are employed; but I do not limit myself to this or any other number of electromagnets. It is advisable, however, to employ a plurality of electromagnets, so that if the capacity of the first of the series is overtaxed the succeeding ones supplement their action, and for the further reason that the pole-pieces of the several magnets, beginning with the first, may be placed in gradually increasing proximity to the ore-current. Thus the first of the electromagnets will attract a less number of particles than if located nearer the ore-current, and consequently there will be a less number of unattracted particles disturbed and swept out of the main current toward the margin of the belt D, while the last of the series, located at the minimum distance from the ore-current, can be relied on to withdraw whatever of particles to be attracted have been left by its predecessors. This carrying of unattracted particles out of the main ore-current takes place, however, to some extent, and may be compensated by making the belt D about two and one-half inches wider than the ore-current and having the magnet pole-pieces project about one inch beyond said current. The attracted particles of low magnetic susceptibility which it is desired to separate under these conditions will, for the most part, be swept clear of the belt D by the cross-belts L; but those which are not, together with those portions of the unattracted particles brushed out of the main ore-current by the transverse movement of the attracted particles depending from the cross-belts, will constitute a middle product, which will be carried along by the slat or partition $G^2$ and received into the receptacle $G'$, whence they are returned to the feed-hopper and returned with the crude ore, so as to pass again through the apparatus.

With an electromagnet of the size and relative dimensions specified, and with the pole-pieces spaced at about three-fourths of an inch apart, I have found that a current of six ampères and fifty volts passed through the magnet-windings from a continuous-current dynamo will suffice to magnetize the pole-pieces sufficiently to attract the mineral franklinite, garnet and troostite from crushed franklinite ore under the conditions specified and to effect their separation to the degree required to render the remaining willemite or zincite present in such ore suitable for the Belgian furnace after subsequent jigging out of the calcite present and the sifting out of such fines as will pass through a sieve of No. 60 mesh. Thus with three of such electromagnets acting upon a moving layer of comminuted garnet, franklinite, troostite and willemite one-eighth of an inch in thickness, the first of said magnets being located at a height of one-half an inch above the ore, the second magnet three-eighths of an inch, and the third one-fourth of an inch, I have successfully removed the franklinite, troostite and garnet from the willemite. The speed of travel of the belts for this practice is about fifty-five feet per minute.

Having thus described my invention, what I claim is—

1. In a magnetic separator, an electromagnet having a pole-piece tapering toward its free end, said free end being of less sectional area than the magnet-core so as to highly condense the lines of magnetic force, an ore-conveyer below and in close proximity to said tapering end and conveying the ore through a portion of the highly-concentrated field, the tapering end of the pole-piece being arranged transversely to the direction of travel of the conveyer, and a second conveyer for withdrawing the attracted particles.

2. The combination with an ore-conveyer, of electromagnetic pole-pieces located above and in near proximity to its conveying-surface, said pole-pieces having tapering ends transverse to the direction of movement of the ore and adjustable toward and from each other, and having a substantially uniform field of force across the conveying-surface, and a second conveyer for withdrawing the attracted particles from the magnetic field.

3. The combination with an ore-conveyer, of an electromagnet located above and in near proximity to its conveying-surface, said magnet having tapering pole-pieces transverse to the direction of movement of the ore, and an inclosing frame of non-magnetic material for the pole-pieces, the pole-pieces being adjustable within the frame.

4. The combination with an ore-conveyer, of an electromagnet located above and in near proximity to its conveying-surface, said magnet having tapering pole-pieces transverse to the direction of movement of the ore and adjustable toward and from each other, an inclosing frame for the pole-pieces, and a spacing-piece between the pole-pieces.

5. The combination with an ore-conveyer, of an electromagnet above and in near proximity to its conveying-surface, said magnet having its pole-pieces transverse to the direction of movement of the ore, said pole-pieces decreasing in thickness from the cores outwardly toward each other, whereby a high condensation of the magnetic field is obtained, and a second conveyer for withdrawing the attracted material from the magnetic field.

In testimony whereof I affix my signature in presence of two witnesses.

JOHN PRICE WETHERILL.

Witnesses:
HUGH M. STERLING,
JOHN C. PENNIE.